2,702,299

Patented Feb. 15, 1955

2,702,299

MANUFACTURE OF TETRAETHYL PYROPHOSPHATE

John Sterling Harris, Richmond Heights, Mo., assignor to Monsanto Chemical Company, St. Louis, Mo., a corporation of Delaware No Drawing. Original application May 1, 1948, Serial No. 24,683. Divided and this application December 26, 1950, Serial No. 202,815

4 Claims. (Cl. 260—461)

This invention relates to compositions containing increased amounts of tetraethyl pyrophosphate, and more particularly to a process for the manufacture of tetraethyl pyrophosphate.

Compositions containing tetraethyl pyrophosphate are widely used as agricultural economic poisons, particularly against many insects such as aphids and against many acarina such as the red spider mites, however, such compositions may be used generally against the lower forms of life which, in the past, have been combatted by the use of nicotine or nicotine salts. Furthermore, tetraethyl pyrophosphate has been found useful in the preparation of insectivoricide and rodenticide compositions.

While the art has disclosed several methods for the preparation of tetraethyl pyrophosphate, most of these methods are of interest only from a purely academic and theoretical view point. Prior to this invention, there has not been a practical commercial process for the production of tetraethyl pyrophosphate in good yields from readily available raw materials. It has become known to the art that when phosphorus oxychloride is reacted with the neutral triethyl ester of ortho-phosphoric acid in a mol ratio of about 1:3 at temperatures of about 130° C. to 150° C., while the resulting mixture of reaction products contains predominantly hexaethyl tetraphosphate, there is also present in the mixtures of reaction products about 10–12%, and seldom more than 15%, of tetraethyl pyrophosphate. It is extremely difficult and tedious to concentrate or separate the tetraethyl pyrophosphate from the mixture of reaction products as almost all of these reaction products are subject to hydrolysis when in contact with water and when separation is attempted by fractional distillation, the fractionation must be carried out under a vacuum of a fraction of a millimeter of mercury, as decomposition of the tetraethyl pyrophosphate takes place at the temperatures required for distillation under a lower vacuum and maintenance of such very high vacuums for distillation purposes is extremely expensive and undesirable in a commercial process.

It is an object of this invention, therefore, to provide a process for the production of tetraethyl pyrophosphate in substantially increased yields over the yields obtained by the processes presently known to the art. A further object is to provide a process for the production of reaction mixtures containing tetraethyl pyrophosphate in substantially increased concentrations over the concentrations obtained from the processes presently known to the art. A still further object of this invention is to provide biological toxicant compositions containing increased amounts of tetraethyl pyrophosphate which possess over 300% greater biological activity for the combatting and control of pests such as aphids and mites than do the compositions containing tetraethyl pyrophosphate which are presently known to the art.

In the practice of this invention, the mixtures of reaction products from the processes of this invention contain substantially 40%, that is 38–45%, of tetraethyl pyrophosphate as contrasted with the processes of the prior art which yielded mixtures of the reaction products containing only 10–15% of the tetraethyl pyrophosphate. For uses where substantially pure tetraethyl pyrophosphate is required, the tetraethyl pyrophosphate may be separated from the mixtures of reaction products by high vacuum fractional distillation (below one millimeter of mercury) or by one of the solvent extraction methods as are described and claimed in United States patent application Serial No. 24,918, filed May 3, 1948, now United States Patent No. 2,523,613 of Dvornikoff or patent application Serial No. 24,672, filed May 1, 1948, now United States Patent No. 2,523,243 of Willis. It is evident that when substantially pure tetraethyl pyrophosphate is required, that the recovery of the tetraethyl pyrophosphate from the reaction mixture of this invention containing 38–45% of tetraethyl pyrophosphate is much more efficient and is to be preferred over the recovery of the tetraethyl pyrophosphate from the reaction mixtures of the prior art which contain only 10–15% of tetraethyl pyrophosphate. However, the reaction mixtures themselves from the processes of this invention may be advantageously and satisfactorily used as biological toxicants, likewise these reaction mixtures as such may be used to formulate biological toxicant compositions without first separating the tetraethyl pyrophosphate from the reaction mixtures. The mixtures of reaction products from the processes of this invention are over 300% as biologically active against such pests as aphids and mites as are the compositions containing only 10–15% of tetraethyl pyrophosphate which are presently known to the art.

I have discovered that tetraethyl pyrophosphate may be contained in substantially 40% yields by the reaction of hexaethyl tetrapolyphosphate with triethyl phosphate in the mol ratio of substantially 1 mol of the hexaethyl tetrapolyphosphate to 2 mols of the triethyl phosphate. This reaction may be carried out within the temperature range of 125° C. to 160° C. However, the optimum yields are obtained when the reaction is carried out at a temperature of substantially 145° C.

While the highest yields of tetraethyl pyrophosphate are obtained when hexaethyl tetrapolyphosphate is reacted with triethyl phosphate in the mol ratio of 1 mol of hexaethyl tetrapolyphosphate to substantially 2 mols of triethyl phosphate, yields of substantially 40% tetraethyl pyrophosphate may be obtained when 1.5 to 3 mols of triethyl phosphate are reacted with 1 mol of hexaethyl tetrapolyphosphate. However, it is preferred to hold the mol ratio within the rate of 1 mol of hexaethyl tetrapolyphosphate to 1.9 to 2.1 mols of triethyl phosphate. In carrying out the process of this invention, the hexaethyl tetrapolyphosphate need not be separated from the mixtures of reaction products by which the hexaethyl tetrapolyphosphate was made. Rather, the triethyl phosphate may be added to the reaction mixtures containing the hexaethyl tetrapolyphosphate in the proper mol proportions and the reaction carried out under the described conditions to obtain reaction mixtures containing tetraethyl pyrophosphate in a substantially 40% yield.

The following examples are illustrative of the method by which this invention may be practiced, however, it is not intended that this invention be limited solely to the processes as set forth in the following examples:

Example I 506 g. (1 mol) of hexaethyl tetraphosphate were slowly warmed to 135° C. in a glass reaction vessel equipped with a reflux condenser and 364.4 g. (2 mols) of triethyl phosphate were gradually added, with stirring, to the warmed hexaethyl tetraphosphate at such a rate so as to maintain a reaction temperature of about 135° C. After all of the triethyl phosphate had been added to the hexaethyl tetraphosphate, the reaction mixture was then heated to about 145° C. and thereafter maintained at 145° C. for an additional two hours during which time the reaction mass was continuously stirred. Quantitative chemical analysis of the reaction mixture indicated that the reaction mixture contained 40.5% tetraethyl pyrophosphate, and biological assay of the reaction mixture indicated that the biological activity of this reaction mixture was more than 300% greater than the biological activity of compositions containing hexaethyl tetrapolyphosphate or the compositions containing 10–15% tetraethyl pyrophosphate which are known to the art.

Example II

The mixture of reaction products from Example I, containing 40.5% tetraethyl pyrophosphate was fractionally distilled under a very high vacuum (0.5 millimeter of mercury) and substantially pure tetraethyl pyrophosphate recovered.

Example III

U. S. Patent No. 2,402,703 to Woodstock also relates to the production of hexaesters of tetraphosphoric acid.

A reaction mixture containing substantially hexaethyl tetraphosphate was prepared according to the teachings of that patent:

156 g. of P₂O₅ were slowly added to and reacted with 400 g. of triethyl phosphate at 50° C. in a cooled glass reaction vessel. The P₂O₅ was added at such a rate so as to maintain a reaction temperature of about 50° C. Thereafter the mixture was stirred for an additional two hours to give a first reaction product which, according to U. S. Patent No. 2,402,703, is predominantly hexaethyl tetraphosphate.

This first reaction mixture containing predominantly hexaethyl tetraphosphate is then slowly heated, with stirring, to 120° C. in a glass reaction vessel and an additional 400 g. of triethyl phosphate are slowly added, while the stirring is continued and the temperature is maintained at 120° C. Thereafter, the temperature is increased to 145° C. and the reaction mixture is continuously stirred while the temperature is maintained at 145° C. for an additional two hours, yielding a second reaction mixture containing substantially 40% tetraethyl pyrophosphate.

In the above examples, the hexaethyl tetraphosphate, or the reaction mixture containing hexaethyl tetraphosphate, may have been maintained at a temperature with the range of 120° C. to 150° C. during the addition of the triethyl phosphate, however, it is preferred to maintain the temperature at 120° C. to 130° C. during the addition of the triethyl phosphate. The temperature during the "finishing period," that is the period following the completed addition of the triethyl phosphate to the hexaethyl tetraphosphate or reaction mixture containing the hexaethyl tetraphosphate, may be from 130° C. to 160° C. for a "finishing period" of 1 to 5 hours, the longer periods of time being required at the lower temperatures of about 130° C., and the use of the higher temperatures of 150° C. to 160° C. during the finishing period being limited by a resulting darkening of the product due to decomposition. The preferred finishing conditions are a temperature of about 142° C. and a period of 2 to 3 hours.

If it is desired, the tetraethyl pyrophosphate, which is produced in accordance with the directions of the above examples, may be separated from the reaction mixtures by fractional distillation, or otherwise, or the mixtures of reaction products containing the tetraethyl pyrophosphate may be used as such in the formulation of compositions for use as economic poisons. These mixtures of reaction products, containing substantially 40% tetraethyl pyrophosphate may be formulated into either liquid or powder types of compositions of increased biological activity. For example, one of the above mixtures of reaction products containing substantially 40% tetraethyl pyrophosphate may be formulated by spraying the said mixture onto finely ground diatomaceous earth. In the control of aphids and mites, a dust containing about 5% of tetraethyl pyrophosphate is usually satisfactory and such a dust may be prepared by spraying 97.5 pounds of finely ground diatomaceous earth with 12.5 pounds of a mixture of reaction products such as was described in Example I, and which contains substantially 40% of tetraethyl pyrophospate. The diatomaceous earth which has been sprayed with the reaction mixture containing the tetraethyl pyrophosphate is then tumbled in a rotary drum until the dust is well-mixed.

In place of the diatomaceous earth, talc or pyrophyllite may be used as the inert diluent or solid carrier for the tetraethyl pyrophosphate. A more readily wettable powder may be prepared by mixing 1% of a wetting agent with the diatomaceous earth, or other carrier or inert diluent, and subsequently spraying the mixture of carrier and wetting agent with a reaction mixture or a solvent solution of a reaction mixture containing tetraethyl pyrophosphate, and then tumbling the sprayed mixture in a rotary drum until the dust is well-mixed.

In some instances, it is more desirable to have a liquid mixture, of tetraethyl pyrophosphate and a liquid carrier, which is suitable for spraying. Such a liquid mixture may be prepared by dissolving about one part of a wetting agent and one part of one of the mixtures of reaction products, such as was prepared in Example I, in 1600 parts of water. While water is the most conveniently used liquid carrier, other suitable liquid carriers are aromatic solvents such as benzene, toluene, xylene and naphthalenes.

Suitable wetting agents for use in liquid mixtures or for the preparation of the wettable dusts, as described above, may be the alkali metal salts of a mono-, di- or tri-sulfonate or sodium dodecyl benzene sulfonate. Other types of sulfated and sulfonated wetting agents which are also suitable are the sulfo-succinic acid dialkyl esters such as sodium dioctyl sulfo-succinate and the decyl or dodecyl sodium sulfates. Also suitable are the poly-ethylene oxide condensation products of alkyl substituted phenols (wherein the alkyl substituent contains 4 to 18 carbon atoms) with 8 to 25 mols of ethylene oxide, for example the condensation product of 1 mol of octyl phenol with 10 to 12 mols of ethylene oxide.

The mixtures of reaction products containing substantially 40% tetraethyl pyrophosphate of this invention may also be formulated into concentrates for forming oil-in-water emulsions for use as insecticidal compositions. A self-dispersing, water dispersible concentrate for forming stable oil-in-water emulsions may be prepared by preparing a mixture containing 85.0% xylene, 5.0% dodecylbenzene sodium sulfonate, 5.0% of the condensation product of 1 mol of octyl phenol and 10–12 mols of ethylene oxide and 5% of the mixture of reaction products containing substantially 40% tetraethyl pyrophosphate such as was described under Example I in accordance with the practice of this invention. The above concentrate may be added to water in almost any proportion desired for the formation of a permanent oil-in-water emulsion for use as an insecticidal composition against aphids and red spider mites.

This application is a division of my co-pending application Serial Number 24,683, filed May 1, 1948, now Patent No. 2,572,806.

I claim:

1. In a process for the manufacture of tetraethyl pyrophosphate, the step comprising reacting together at a temperature within the range of 120 to 160° C. and for a period of 1 to 5 hours, substantially 2 molecular proportions of triethyl phosphate and the reaction product obtained by reacting at a temperature of about 50° C., one molecular proportion of P₂O₅ and substantially two molecular proportions of triethyl phosphate.

2. In a process for the manufacture of tetraethyl pyrophosphate, the steps comprising adding at temperatures between the limits of 120 and 150° C., substantially two molecular proportions of triethyl phosphate to a reaction product obtained by reacting together at a temperature of about 50° C., one molecular proportion of P₂O₅ and substantially 2 molecular proportions of triethyl phosphate, and thereafter maintaining the temperature of the reaction within the range of 130 to 160° C. for 1 to 5 hours.

3. In a process for the manufacture of tetraethyl pyrophosphate, the steps comprising adding at temperatures between the limits of 120 to 130° C., substantially two molecular proportions of triethyl phosphate to a reaction product obtained by reacting together at a temperature of about 50° C., one molecular proportion of P₂O₅ and substantially 2 molecular proportions of triethyl phosphate, and thereafter maintaining the temperature of the reaction at about 145° C. for 2 to 3 hours.

4. In a process for the manufacture of tetraethyl pyrophosphate, the step comprising reacting at a temperature within the range of 120 to 160° C. and for a period of 1 to 5 hours, 1.5 to 3 molecular proportions of triethyl phosphate and the reaction product obtained by reacting at a temperature of about 50° C., one molecular proportion of P₂O₅ and substantially two molecular proportions of triethyl phosphate.

References Cited in the file of this patent

UNITED STATES PATENTS

| | | |
|---|---|---|
| 2,402,703 | Woodstock | June 25, 1946 |
| 2,523,613 | Dvornikoff | Sept. 26, 1950 |
| 2,531,354 | Dvornikoff | Nov. 21, 1950 |
| 2,554,757 | Smith et al. | May 29, 1951 |
| 2,572,806 | Harris | Oct. 23, 1951 |

OTHER REFERENCES

Cavalier "Comptes rendus," vol. 142 (1906), pp. 885 to 887.

Hall et al., "Ind. and Eng. Chem.," vol. 40 (April 1948), pp. 694 to 699.